(12) United States Patent
Park et al.

(10) Patent No.: US 8,143,783 B2
(45) Date of Patent: Mar. 27, 2012

(54) DISPLAY APPARATUS

(75) Inventors: In Jae Park, Seoul (KR); Moon Soo Nho, Ujeongou-si (KR)

(73) Assignee: Sungeum Music Co. Ltd (KR)

( * ) Notice: Subject to any disclaimer, the term of this patent is extended or adjusted under 35 U.S.C. 154(b) by 525 days.

(21) Appl. No.: 12/415,330

(22) Filed: Mar. 31, 2009

(65) Prior Publication Data

US 2010/0066648 A1    Mar. 18, 2010

(30) Foreign Application Priority Data

Sep. 17, 2008   (KR) ........................ 10-2008-0091091

(51) Int. Cl.
*H01J 1/62* (2006.01)
*G10G 7/02* (2006.01)

(52) U.S. Cl. ............. 313/510; 349/142; 84/455; 345/38

(58) Field of Classification Search .................. 313/510; 345/33, 38, 39, 467; 340/815.4, 815.53; 349/142

See application file for complete search history.

(56) References Cited

U.S. PATENT DOCUMENTS

| | | | | |
|---|---|---|---|---|
| 3,971,012 A | * | 7/1976 | Morokawa et al. | 345/33 |
| 4,700,183 A | * | 10/1987 | White | 345/46 |
| 4,932,756 A | * | 6/1990 | Spicer | 349/142 |
| 5,371,511 A | * | 12/1994 | Atherton et al. | 345/38 |
| 6,317,184 B1 | * | 11/2001 | Kwan et al. | 349/142 |
| 7,663,043 B2 | * | 2/2010 | Park | 84/455 |
| 2005/0183566 A1 | * | 8/2005 | Nash | 84/601 |
| 2009/0056523 A1 | * | 3/2009 | Park | 84/455 |

* cited by examiner

*Primary Examiner* — Peter Macchiarolo
(74) *Attorney, Agent, or Firm* — Robert Becker; Robert Becker & Associates

(57) ABSTRACT

A display apparatus for displaying indications using liquid crystal or Light-Emitting Diodes (LEDs) that includes a 12-segment display, including a first segment horizontally disposed with an inverted trapezoidal shape, a second segment disposed under the right end of the first segment with a parallelogram shape, a third segment disposed under the second segment with an isosceles triangle shape, a fourth segment disposed under the third segment with a parallelogram shape, a fifth segment horizontally disposed beside the bottom end of the fourth segment with a trapezoidal shape, a sixth segment disposed over the left end of the fifth segment with a parallelogram shape, a seventh segment disposed over the sixth segment with an isosceles triangle shape, an eighth segment with a parallelogram shape, ninth and tenth segments horizontally disposed between the triangular segments with a square shape, and eleventh and twelfth segments respectively disposed over and under the ninth segment with a square shape.

4 Claims, 5 Drawing Sheets

DISPLAY APPARATUS

BACKGROUND OF THE INVENTION

1. Field of the Invention

The present invention relates to a display apparatus that displays indications, such as the letters of the alphabet, using liquid crystal or Light-Emitting Diodes (LEDs), and, more particularly, to a display apparatus that displays on a display panel the specific letters [A] to [G] of the alphabet indicating the musical note, the letters [H] and [L] of the alphabet indicating high and low, and Arabic numerals 0 and 1 to 9 using a 12-segment display into which 12 segments are combined, thereby clearly displaying the letters of the alphabet and the Arabic numerals and enabling a viewer to recognize indications rapidly.

2. Description of the Related Art

In general, display apparatuses are widely used to display the functions of various electronic or electrical products, and function to enable users to visually check the status of modes set in response to input signals.

For example, when a user sets a desired mode using a button installed in an electronic product or a remote controller, the electronic product displays the mode on a display apparatus, and thus a user can check the status of a current mode, thereby enabling the user to conveniently use the electronic product.

Hitherto, as shown in FIG. 1, various numerals and the letters of the alphabet have been displayed using a 7-segment display 100 in which seven segments 100a, each formed in a long bar shape and of liquid crystal or an LED, are combined together in a figure-8 shape.

However, although the above conventional 7-segment display 100 can correctly display the Arabic numerals, it is problematic in that it cannot clearly display letters of the alphabet, that is, letters of the English alphabet.

Meanwhile, a guitar is a musical instrument that is played by the strumming of a plurality of guitar strings. There are generally six guitar strings arranged in parallel to generate different notes. After the guitar strings have been strung, each of the guitar strings is tuned by the turning of a peg so that a unique note is generated by each string.

In order to express the notes of the seven-note that are sounded when the guitar strings are tuned, the seven letters [A] to [G] of the alphabet are used. In the case of C major, [A] is a musical note indication indicating [La], [B] is a musical note indication indicating [Si], [C] is a musical note indication indicating [Do], [D] is a musical note indication indicating [Re], [E] is a musical note indication indicating [Mi], [F] is a musical note indication indicating [Fa], and [G] is a musical note indication indicating [Sol].

In general, a first guitar string from the bottom is tuned to generate the note [E] in the state in which guitar strings are not pressed against the fingerboard, a second guitar string is tuned to generate the note [B] in that same state, a third guitar string is tuned to generate the note [G] in that state, a fourth guitar string is tuned to generate the note [D] in that state, a fifth guitar string is tuned to generate the note [A] in that state, and a sixth guitar string is tuned to generate the note [E] in that state. The guitar strings may also be indicated using Arabic numerals 1, 2, 3, 4, 5 and 6.

A performer tunes six guitar strings in such a way as to generate unique standard notes while pressing the guitar strings on the fingerboard and generating various notes. There is a problem in that the seven letters [A] to [G] of the alphabet indicating the notes of the guitar strings cannot be indicated clearly using the conventional 7-segment display 100 mentioned previously.

As described above, according to the prior art, note indications in the forms of the letters of the alphabet representing the notes of the guitar strings cannot be clearly indicated, so that a performer who tunes the guitar strings cannot easily recognize the note indications.

SUMMARY OF THE INVENTION

Accordingly, the present invention has been made keeping in mind the above problems occurring in the prior art, and an object of the present invention is to provide a display apparatus which can clearly indicate guitar string musical note indications [A] to [G], the letters [H] and [L], and Arabic numerals 0 and 1 to 9 on a screen, so that a performer who tunes the guitar strings can recognize the musical note indications easily and rapidly.

In order to accomplish the above object, the present invention provides a display apparatus for displaying indications using liquid crystal or Light-Emitting Diodes (LEDs), the display apparatus comprising a 12-segment display including 12 liquid crystal or LED segments, wherein the 12-segment display includes a first segment horizontally disposed on the upper side of the 12-segment display and configured to have an inverted trapezoidal shape; a second segment disposed under the right end of the first segment in a downward direction and configured to have a parallelogram shape; a third segment disposed under the second segment and configured to have an isosceles triangle shape with a radially inwardly disposed apex; a fourth segment disposed under the third segment in a downward direction and configured to have a parallelogram shape; a fifth segment horizontally disposed beside the bottom end of the fourth segment in a left direction and configured to have a trapezoidal shape corresponding to the shape of the first segment; a sixth segment disposed over the left end of the fifth segment in an upward direction and configured to have a parallelogram shape corresponding to the shape of the fourth segment; a seventh segment disposed over the sixth segment and configured to have an isosceles triangle shape with a radially inwardly disposed apex; an eighth segment disposed between the top end of the seventh segment and the right end of the first segment and configured to have a parallelogram shape corresponding to the shape of the second segment; ninth and tenth segments horizontally disposed between the segments having an isosceles triangle shape and configured to have a square shape; and eleventh and twelfth segments respectively disposed on the upper and lower sides of the ninth segment and configured to have a square shape.

Gaps may be disposed between the respective segments.

Outside corners formed by the first segment and the eighth segment, the first segment and the second segment, the fourth segment and the fifth segment, and the fifth segment and the sixth segment may be cut away to form bevels.

The display means of the 12-segment display 10 may be inclined to the right.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

An embodiment of the present invention will be described in detail with reference to the accompanying drawings.

Figure 1:
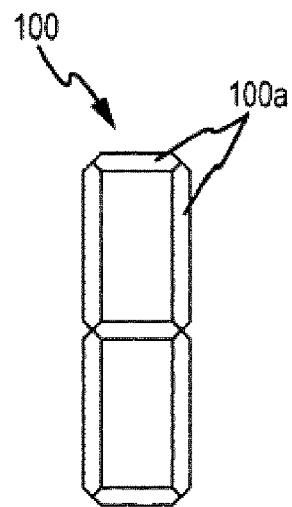
FIG. 1 is a diagram showing a liquid crystal or LED 7-segment arrangement that displays the letters of the alphabet and numerals through a combination in a conventional figure-8 shape.
Figure 2:
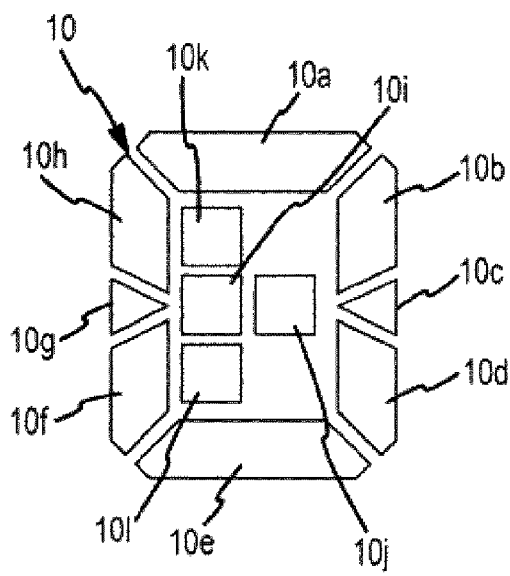
FIG. 2 is a diagram showing the arrangement of liquid crystal or LED segments of a display apparatus according to the present invention.
Figure 3A:
FIG. 3a is a display state diagram showing the letters [A] to [G] of the alphabet, that is, note indications, using liquid crystal or LED segments according to the present invention.
Figure 3B:
FIG. 3b is a display state diagram showing the letters [H] and [L] of the alphabet, that is, high and low indications, using liquid crystal or LED segments according to the present invention.
Figure 3C:
FIG. 3c is a display state diagram showing Arabic numerals 0 and 1 to 9 using liquid crystal or LED segments according to the present invention.

FIG. 2 is a diagram showing the arrangement of liquid crystal or LED segments of a display apparatus according to the present invention. FIG. 3A is a display state diagram showing the letters [A] to [G] of the alphabet, that is, note indications, using the liquid crystal or LED segments according to the present invention. FIG. 3B is a display state diagram showing the letters [H] and [L] of the alphabet, that is, high and low indications, using liquid crystal or LED segments according to the present invention. FIG. 3C is a display state diagram showing Arabic numerals 0 and 1 to 9 using liquid crystal or LED segments according to the present invention.

As shown in FIGS. 2, 3A, 3B, and 3C, the display apparatus of the present invention is an apparatus that is useful for displaying the letters [A] to [G] of the alphabet indicating musical note indications, letters [H] and [L] of the alphabet indicating high and low, and Arabic numerals 0 and 1 to 9 using liquid crystal or LEDs.

The display apparatus of the present invention uses a 12-segment display 10 in which a display means includes 12 liquid crystal or LED segments.

The 12-segment display 10 includes a first segment 10a horizontally disposed on the upper side of the 12-segment display 10 and configured to have an inverted trapezoidal shape, a second segment 10b disposed under the right end of the first segment 10a in a downward direction and configured to have a parallelogram shape, a third segment 10c disposed under the second segment 10b and configured to have an isosceles triangle shape with a radially inwardly disposed apex, a fourth segment 10d disposed under the third segment 10c in a downward direction and configured to have a parallelogram shape, a fifth segment 10e horizontally disposed beside the bottom end of the fourth segment 10d in a left direction and configured to have a trapezoidal shape corresponding to the shape of the first segment 10a, a sixth segment 10f disposed over the left end of the fifth segment 10e in an upward direction and configured to have a parallelogram shape corresponding to the shape of the fourth segment 10d, a seventh segment 10g disposed over the top end of the sixth segment 10f and configured to have an isosceles triangle shape with a radially inwardly disposed apex, an eighth segment 10h disposed between the top end of the seventh segment 10g and the right end of the first segment 10a and configured to have a parallelogram shape corresponding to the shape of the second segment 10a, ninth and tenth segments 10i and 10j horizontally disposed between the segments 10c and 10g having a isosceles triangle shape and configured to have a square shape, and eleventh and twelfth segments 10k and 10l respectively disposed on the upper and lower sides of the ninth segment 10i and configured to have a square shape.

Slight gaps are disposed between the respective 12 segments.

As shown in the drawing, outside corners formed by the first segment 10a and the eighth segment 10h, the first segment 10a and the second segment 10b, the fourth segment 10d and the fifth segment 10e, and the fifth segment 10e and the sixth segment 10f are cut away to form bevels. The reason why the outside corners are cut away is to smooth the shapes of the displayed letters of the alphabet.

Figure 4:
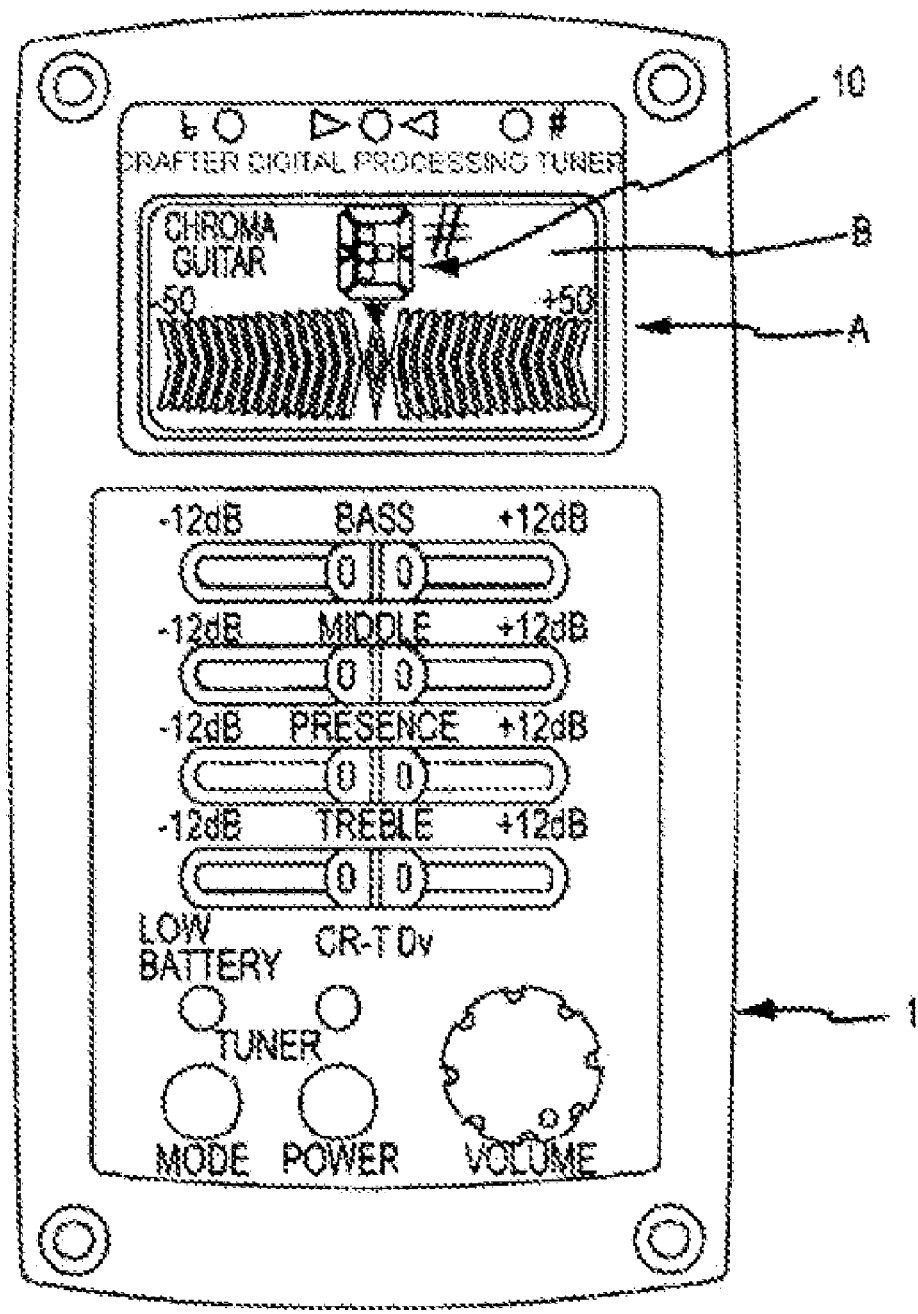
FIG. 4 is a plan view showing a guitar equalizer including the display apparatus to which the liquid crystal or LED segments according to the present invention are applied.
Figure 6:
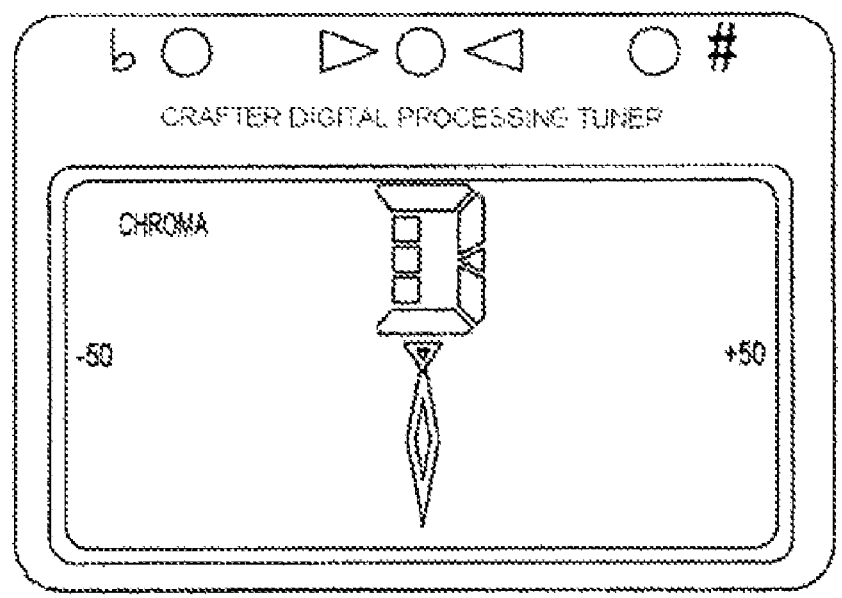
FIG. 6 is a state diagram showing a state in which a specific note indication is displayed on the screen of the display apparatus of FIG. 4.

The display means of the 12-segment display 10 is slightly inclined to the right (see, for example, FIGS. 4 & 6). The reason why the display means is slightly inclined to the right is to make smooth the shapes of the letters of the alphabet and make the letters appear similar to letters as they generally appear.

The letters [A], [B], [C], [D], [E], [F] and [G], of the alphabet displayed using the display means of the 12-segment display 10 as described above are illustrated in FIG. 3A. Furthermore, the letters [H] and [L] of the alphabet are illustrated in FIG. 3B, and the Arabic numerals 0 and 1 to 9 are illustrated in FIG. 3C. As illustrated in the drawings, all the letters and Arabic numerals are indicated clearly.

The reason why the letters and the Arabic numerals are displayed clearly as described above is that the eleventh segment 10k, the ninth segment 10i and the twelfth segment 10l have a square shape and are disposed on the inner side of the eighth segment 10h and the sixth segment 10f, which are vertically disposed on the left side of the 12-segment display 10, and the third segment 10c and the seventh segment 10g have an isosceles triangle shape and are disposed at appropriate locations.

The display means includes liquid crystal or LEDs, but may also include other types of light-emitting means.

Figure 5:
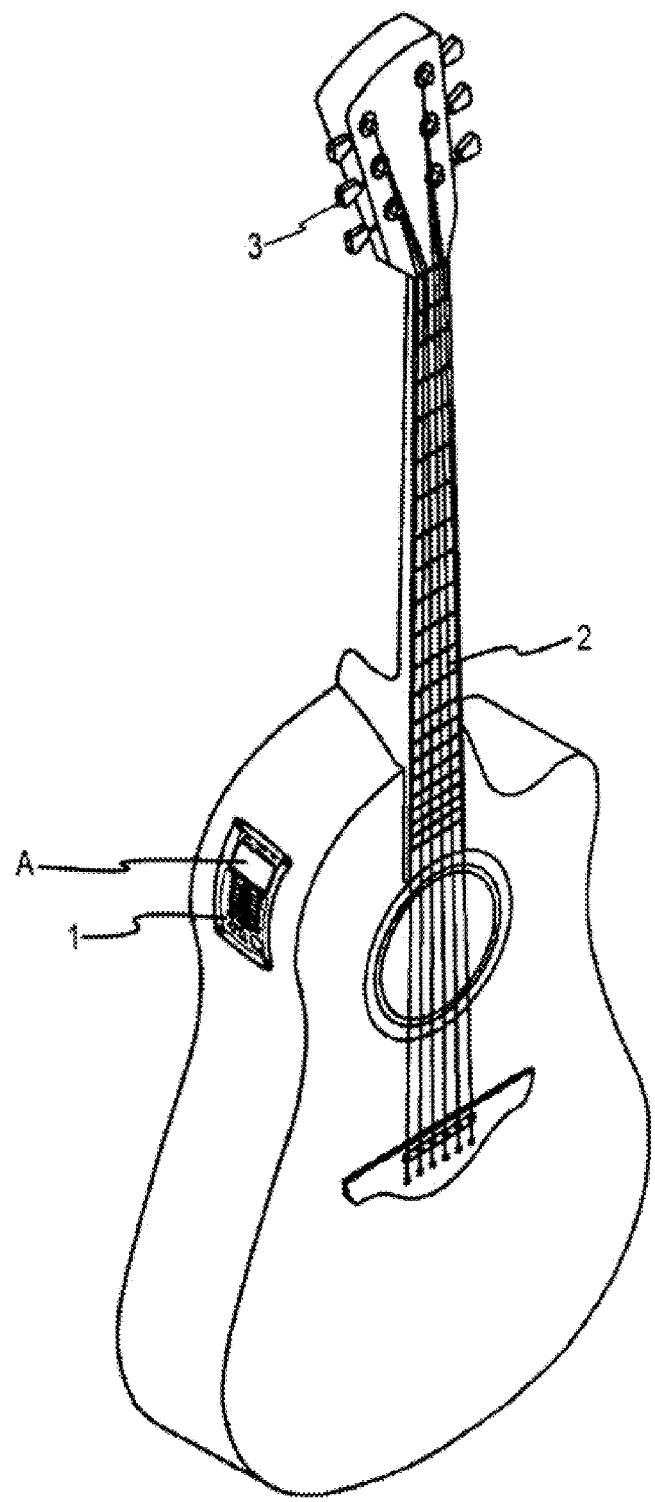
FIG. 5 is a perspective view of a guitar including the equalizer of FIG. 4.

FIG. 4 is a plan view showing a guitar equalizer including the display apparatus with the liquid crystal or LED segments according to the present invention. FIG. 5 is a perspective view of a guitar including the equalizer of FIG. 4. FIG. 6 is a state diagram showing a state in which a specific note indication is displayed on the screen of the display apparatus of FIG. 4.

A display apparatus A equipped with the 12-segment display 10 of the present invention as described above is useful for a tuner for a guitar using letters [A], [B], [C], [D], [E], [F] and [G] of the alphabet indicating seven musical notes. The display apparatus A is included in an equalizer 1 for controlling tone. The equalizer 1 is disposed on a side of a guitar body. In the tuning of a guitar, a note issued when a guitar string 2 is strummed is displayed on a display panel B, and the pitch of the note is adjusted using a peg 3.

The 12-segment display 10 is placed at the center of the display panel B, and displays the above seven letters of the alphabet. FIG. 6 shows a state in which [D] indicating note [Re] is displayed as an example.

Although the 12-segment display 10 of the present invention may be useful in display apparatuses for a tuner, an equalizer, an amplifier and a pedal, which are guitar components, it is not limited thereto and may be applied to all display apparatuses.

The display apparatus of the present invention includes the third segment having an isosceles triangle shape disposed between the second segment and the fourth segment, the seventh segment having an isosceles triangle shape disposed between the eighth segment and the sixth segment, and ninth, tenth, eleventh and twelfth segments having a square shape disposed on the inner side of the eighth and sixth segments, so that not only note indications, that is, the letters [A] to [G] of the alphabet, but also other letters of the alphabet and the Arabic numerals can be clearly displayed on a display screen, with the result that a player can rapidly and accurately discern the displayed tuning status while tuning guitar strings.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus for displaying indications using liquid crystal or Light-Emitting Diodes (LEDs), the display apparatus comprising a 12-segment display comprised of 12 liquid crystal or LED segments, wherein the 12-segment display includes:
    a first segment horizontally disposed on an upper side of the 12-segment display and configured to have an inverted trapezoidal shape;
    a second segment disposed under a right end of the first segment and extending in a downward direction from, and perpendicular to, the first segment, wherein the second segment is configured to have a parallelogram shape;
    a third segment disposed under the second segment and configured to have an isosceles triangle shape with a radially inwardly disposed apex;
    a fourth segment disposed under the third segment in a downward direction and configured to have a parallelogram shape;
    a fifth segment horizontally disposed beside a bottom end of the fourth segment and extending in a left direction from, and perpendicular to, the fourth segment, wherein the fifth segment is configured to have a trapezoidal shape corresponding to the shape of the first segment as a mirror image thereof;
    a sixth segment disposed over a left end of the fifth segment and extending in an upward direction from, and perpendicular to, the fifth segment, wherein the sixth segment is configured to have a parallelogram shape corresponding to the shape of the fourth segment as a mirror image thereof;
    a seventh segment disposed over the sixth segment and configured to have an isosceles triangle shape with a radially inwardly disposed apex;
    an eighth segment disposed between a top end of the seventh segment and a right end of the first segment and extending perpendicular to the first segment, wherein the eighth segment is configured to have a parallelogram shape corresponding to the shape of the second segment as a mirror image thereof;
    ninth and tenth segments horizontally disposed between the third and seventh segments having an isosceles triangle shape, wherein the ninth and tenth segments are configured to have a square shape; and
    eleventh and twelfth segments respectively disposed on upper and lower sides of the ninth segment, wherein the eleventh and twelfth segments are configured to have a square shape.

2. The display apparatus as set forth in claim 1, wherein gaps are disposed between the respective segments.

3. The display apparatus as set forth in claim 1, wherein outside corners formed by the first segment and the eighth segment, by the first segment and the second segment, by the fourth segment and the fifth segment, and by the fifth segment and the sixth segment are cut away to form bevels.

4. The display apparatus as set forth in claim 1, wherein a display formed by the 12-segment display is inclined toward a right side.

\* \* \* \* \*